United States Patent [19]

Margaris

[11] Patent Number: 5,075,612
[45] Date of Patent: Dec. 24, 1991

[54] METHOD AND DEVICE FOR DETERMINING THE OPTIMAL EXCITATION VALUE WHICH MINIMIZES THE ELECTROMAGNETIC LOSSES OF ELECTRIC MACHINES

[76] Inventor: Nikolaos Margaris, 1 Karakasi, Salonica, Greece, 54248

[21] Appl. No.: 610,413

[22] Filed: Nov. 7, 1990

[30] Foreign Application Priority Data

Jan. 3, 1990 [GR] Greece .............................. 900100003

[51] Int. Cl.$^5$ .............................................. H02P 5/16
[52] U.S. Cl. .................................... 318/807; 318/767; 318/799; 318/254
[58] Field of Search ............... 318/721, 794, 230, 811, 318/696, 685, 254, 801, 767, 798–799, 805–810

[56] References Cited

U.S. PATENT DOCUMENTS

| | | | |
|---|---|---|---|
| 3,781,616 | 12/1973 | Makrytzki et al. | 318/801 |
| 4,221,983 | 9/1980 | Meurier | 318/794 |
| 4,868,479 | 9/1989 | Byong-Ho et al. | 318/721 |
| 4,924,156 | 5/1990 | Müller | 318/254 |

Primary Examiner—William M. Shoop, Jr.
Assistant Examiner—John W. Cabeca
Attorney, Agent, or Firm—Peter D. Keefe

[57] ABSTRACT

A method and an electronic device for determining the optimal excitation value (stator current, magnetic flux, magnetic induction) which minimizes the electromagnetic (copper and iron) losses of DC and vector-controlled AC machines. The invention provides the command to the excitation control loop of these electric machines, characterized by the multiplication or amplitude-modulation (1) of a periodic signal of angular frequency proportional to the speed of the electric machine, a first-order low-pass filter (2), an amplifier (3) and a peak detector (4). The output of the peak detector (4) provides the optimal command to the excitation control loop of the electric machine by a signal of amplitude proportional to the rotor current, $i_a$.

15 Claims, 1 Drawing Sheet

METHOD AND DEVICE FOR DETERMINING THE OPTIMAL EXCITATION VALUE WHICH MINIMIZES THE ELECTROMAGNETIC LOSSES OF ELECTRIC MACHINES

BACKGROUND OF THE INVENTION

1. Field of the Invention

The invention relates to a method for determining the optimal excitation value (stator current, magnetic flux, magnetic induction) which minimizes the electromagnetic (copper and iron) losses of DC machines. The invention provides the command to the excitation control loop of the DC machines.

2. Description of the Prior Art

It is known that, when a DC machine is not required to operate at its nominal load, it need not be excited with its nominal excitation. See M. Kostenko, L. Piotrovsky: "Machines Electriques", pp. 268-272, Ed. Mir, Moscow, 1974; and C. C. Siskind: "Electrical Machines Direct and Alternating Current", pp. 191-194, McGraw-Hill, 1959. All excess excitation contributes to an increase of the machine's electromagnetic losses. By adjusting the excitation of the DC machine according to its load requirements, its electromagnetic losses are decreased and its efficiency is accordingly increased. It is obvious that, the lower the load, the higher the increase in efficiency. When the load equals its nominal value, the nominal excitation is then required. In that case the efficiency of the DC machine cannot be increased, unless errors were made during the design of the machine, or inadequate materials were used during manufacturing. It is known that, at steady state (when both speed and torque are constant) the electromagnetic losses of DC machines can be minimized if the excitation is accordingly adjusted. The minimality condition comes in the following general form:

$$x_{opt} = f(i_a, \omega, \alpha) \quad (1)$$

where $i_a$ is the rotor current, $\omega$ is the speed, $\alpha$ are the parameters of the DC machine and of its loss model and $x_{opt}$ is the optimal excitation. See Kostenko, Piotrovsky, cited above; A. Kusko, D. Galler: "Control Means for Minimization of Losses in AC and DC Motor Drives", I.E.E.E. Trans. on Industrial Applications, Vol. 19, No. 4, July-Aug. 1983; S. C. Hong, M. H. Park: "Microprocessor-Based Optimal Efficiency Drive of Separately Excited DC Motor", Proc. of I.E.E.E. TEN CON, pp. 126-128, 1984; T. Egami, J. Wang, T. Tsuchiya: "Efficiency-Optimized Speed Control System Synthesis Method Based on Improved Optimal Regulator Theory—Application to Separately Excited DC Motor System", I.E.E.E. Trans. on Industrial Electronics, Vol. 32, No. 4, pp. 372-380, Nov. 1985; T. Egami, T. Tsuchiya: "Efficiency-Optimized Speed Control System Based on Improved Optimal Regulator Theory, I.E.E.E. Trans. on Industrial Electronics, Vol. 33, No. 2, pp. 114-125, May 1986; and S. C. Hong, M. H. Park: "Microprocessor-Based High-Efficiency Drive of DC Motor", I.E.E.E. Trans. on Industrial Electronics, Vol. 34, No. 4, pp. 443-440, Nov. 1987. Eq. (1) is valid for any DC machine, regardless of sort of the excitation (separate, compound or series). Eq. (1) is equally valid for ac machines which are controlled using the vector control method. When the vector control method is applied, the AC machine behaves exactly as a separately excited DC machine. See B. K. Bose: "Power Electronics and AC Drives", pp. 264-276, Prentice-Hall, 1986; and G. K. Dubey: "Power Semiconductor Controlled Devices", p. 57, Prentice-Hall, 1989. From Eq. (1) it is obvious that, if the parameters of the DC machine and of its loss model are known, the optimal excitation can be determined by measuring its speed and its rotor current. The same applies for vector-controlled ac machines. The specific form of Eq. (1) heavily depends upon the assumed loss model and the magnetization curve of the DC machine. In general, the form of Eq. (1) is complex and cannot be implemented with analog electronic circuits. See A. Kusko, D. Galler; S. C. Hong, M. H. Park (1984); T. Egami, J. Wang, T. Tsuchiya; and T. Egami, T. Tsuchiya (1986), all of which cited hereinabove. To date Eq. (1) is implemented using microprocessors. See A. Kusko, D. Galler; S. C. Hong, M. H. Park (1984); T. Egami, J. Wang, T. Tsuchiya; T. Egami, T. Tsuchiya (1986); and S. C. Hong, M. H. Park (1987), all of which cited hereinabove; as well as T. Egami, T. Tsuchiya: "Efficiency-Optimized Speed Control System with Feed-Forward Compensation", I.E.E.E. Trans. on Industrial Electronics, Vol. 34, pp. 216-226, May 1987. The microprocessor-based implementation of Eq. (1) generally following two directions. The first focuses on the direct calculation of the second part of Eq. (1). See S. C. Hong, M. H. Park (1984); T. Egami, J. Wang, T. Tsuchiya; T. Egami, T. Tsuchiya (1986); T. Egami, T. Tsuchiya (1987); and S. C. Hong, M. H. Park (1987), all of which cited hereinabove. The second relates to the creation of a lookup table and the seeking of the optimal excitation for every value of the speed and the rotor current of the DC machine. See S. C. Hong, M. H. Park (1987), cited hereinabove.

The microprocessor-based implementation of Eq. (1) and the resulting control system present some serious deficiencies, the most important of them being:

1. The microprocessor-based implementation for old-technology DC machines that use analog control techniques is not simple and comes at a high cost.
2. The microprocessor-based implementation of Eq. (1) requires knowledge of the machine's loss model. Measuring the loss model parameters is extremely difficult and time comsuming, especially for machines already installed and operating. Besides, the loss model parameters of machines coming out of the same production line might be quite diverse, as are the magnetic properties of the iron used for their manufacturing.
3. The direct calculation of the second part of Eq. (1) is complex and time consuming. Thus, a considerable delay is encountered at the control system and the DC machine is not sufficiently responding to abrupt load variations.
4. The direct calculation of the second part of Eq. (1) leads to the minimization of losses, only of the DC machine and not of the losses of the whole control system.
5. Creating a lookup table requires the execution of a variety of measurements. These measurements must be executed for every single machine and are time consuming. For machines already in operation such measurements are practically impossible. Large amounts of memory are also required for storing all possible combinations of $i_a, \omega$ and $x_{opt}$. As storing every single combination of $i_a, \omega$ and $x_{opt}$ is not feasible, minimal losses are not always achieved.

It is widely recognized that all existing minimum loss control methods are complex, come at a high cost and are, therefore, employed only when the energy saving is large enough to justify the additional cost and complexity. See G. K. Dubey, cited hereinabove.

SUMMARY OF THE INVENTION

The invention presents none of the aforementioned deficiencies. Major advantages offered by the invention include:

1. Simple application of the method.
2. Very low cost and simple construction of the electronic device.
3. Simple application of the method and low-cost installation of the electronic device in old-technology already operating DC machine systems, that use analog control techniques.
4. Simple application of the method or low-cost installation of the electronic device in modern-technology DC machine systems, that use digital control techniques (microprocessors).
5. Very fast response to abrupt load variations and absence of effects on the DC machine dynamics.
6. Minimization of losses, not only of the DC machine but of the losses of the whole control system as well.
7. No knowledge of the machine's loss model is required.
8. Adjusting the parameters of the invention is very simple; only very few measurements are needed.

The invention works as follows: A periodic signal of angular frequency proportional to the speed of the DC machine is acquired. This signal is multiplied or amplitude-modulated by another signal whose amplitude is proportional to the rotor current. The multiplied or amplitude-modulated signal is subsequently fed into a low-pass filter having a dominant pole and a dominant zero with time constants T1 and T2 respectively. Finally, the output signal of the low-pass filter is amplified or multiplied by a constant K. If time constants T1 and T2 were set in accordance with the DC machine under control, the amplitude of the periodic signal after amplification or multiplication by the constant K will be equal to the optimal excitation value which minimizes the electromagnetic losses of the DC machine. The method leads to the same results regardless of the sequence of the steps of multiplication or amplitude modulation, filtering and amplification or multiplication by a constant K. The periodic signal of angular frequency proportional to the speed of the DC machine can be acquired, either directly from a tachogenerator coupled to the shaft of the machine or in any other direct or indirect way of speed measurement. If the tachogenerator or any other way of speed measurement produces DC signal, the signal is fed into a voltage-controlled oscillator (VCO) and the desired periodic signal is derived, having an angular frequency proportional to the speed of the DC machine. Among all periodic signals that can possibly be produced, the sinusoidal is preferred because it leads to a better determination of the minimal loss. The signal whose amplitude is proportional to the rotor current may be periodic or DC.

DETAILED DESCRIPTION OF THE PREFERRED EMBODIMENT

Figure 1:
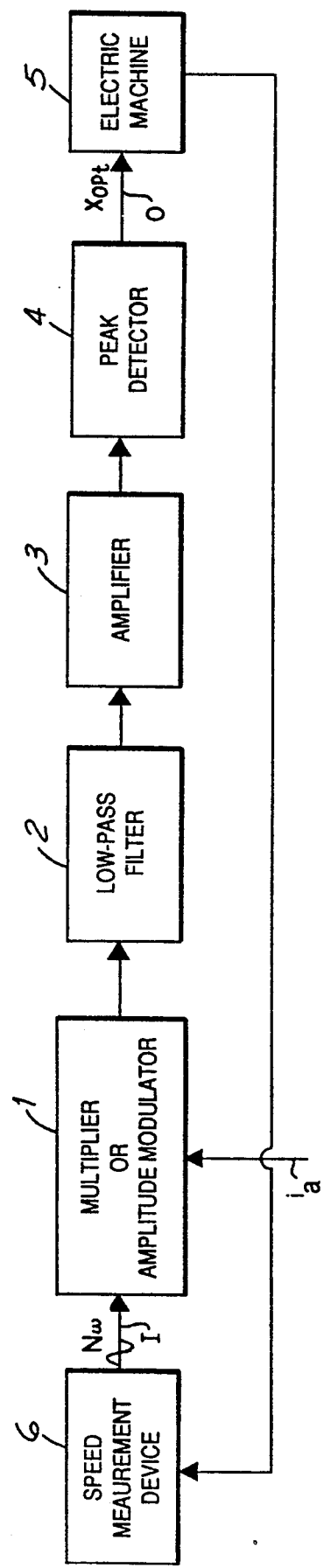
FIG. 1 is a schematic depiction of the functional interrelationship of components for carrying-out the present invention.

FIG. 1 shows a way of carrying out the invention. As shown in FIG. 1, a speed measurement device (6) is coupled with an electric machine (5), which in this case is a DC machine. The output of the speed measurement device is a periodic signal 5 of angular frequency $N\omega$ proportional to the speed of the DC machine whose minimization of electromagnetic losses is desired, is led to the first input of the multiplier or amplitude-modulator (1). Into the second input of (1) is driven a signal proportional to the rotor current, $i_a$. The second signal modulates the periodic signal which was driven into the first input of (1). The output of (1) is driven to the low-pass filter (2). Low-pass filter (2) has a dominant pole and a dominant zero. Time constant T1 corresponds to the dominant pole while time constant T2 corresponds to the dominant zero. The output produced by the low-pass filter (2) is driven to the amplifier (3) whose gain is K. Finally, the output of the amplifier (3) is driven to the peak detector (4). The peak detector (4) output is a DC voltage equal to the amplitude of the periodic signal which is driven to its input O. The output of (4) provides the command to the excitation control loop of the DC machine. If the parameters T1, T2 and K were correctly set, the output voltage of the output O of the peak detector (4) is equal to the optimal excitation value $x_{opt}$, which minimizes the electromagnetic losses of the DC machine.

The aforesaid way to minimize electromagnetic losses is also applicable to an electric machine (5) in the form of a vector-controlled AC machine.

I claim:

1. A method for providing an optimal excitation value with respect to stator current, magnetic flux and magnetic induction, in the form of a command to an excitation control loop of a DC electric machine so as to minimize electromagnetic losses in copper and iron components thereof, where the DC electric machine has a speed of movement between stator and rotor components thereof, the rotor being subjected to a rotor current, said method comprising the steps of:

providing a periodic signal having an angular frequency proportional to the speed of movement between the stator and rotor components of the DC electric machine;

providing a rotor current signal of amplitude proportional to the rotor current;

amplitude-modulating said periodic signal by said rotor current signal to provide a modulated signal;

low-pass filtering said modulated signal to provide a filtered signal, said step of low-pass filtering occurring with a dominant pole time constant of T1 and a dominant zero time constant of T2; and amplifying said filtered signal by a constant K to provide a command signal;

wherein said command signal is sent to the excitation control loop of the DC electric machine; and wherein further each of T1, T2 and K have been set so that said command signal has an optimal excitation value which effects to cause minimization of the electromagnetic losses of the DC electric machine.

2. The method of claim 1, further comprising the step of peak detecting said command signal to provide a peak detected command signal having a DC voltage of an amplitude equal to said periodic signal, the peak detected command signal then being sent to the excitation control loop of the DC electric machine.

3. The method of claim 1, further comprising the step of peak detecting said filtered signal before said step of amplifying.

4. The method of claim 1 wherein said step of providing a periodic signal provides a sinusoidal signal.

5. A method for providing an optimal excitation value with respect to stator current, magnetic flux and magnetic induction, in the form of a command to an excitation control loop of a vector-controlled AC electric machine so as to minimize electromagnetic losses in copper and iron components thereof, where the vector-controlled AC electric machine has a speed of movement between stator and rotor components thereof, the rotor being subjected to a rotor current, said method comprising the steps of:

provided a periodic signal having an angular frequency proportional to the speed of movement between the stator and rotor components of the vector-controlled AC electric machine;

providing a rotor current signal of amplitude proportional to the rotor current;

amplitude-modulating said periodic signal by said rotor current signal to provide a modulated signal;

low-pass filtering said modulated signal to provide a filtered signal, said step of low-pass filtering occurring with a dominant pole time constant of T1 and a dominant zero time constant of T2; and amplifying said filtered signal by a constant K to provide a command signal;

wherein said command signal is sent to the excitation control loop of the vector-controlled AC electric machine; and wherein further each of T1, T2 and K have been set so that said command signal has an optimal excitation value which effects to cause minimization of the electromagnetic losses of the vector-controlled AC electric machine.

6. The method of claim 5, further comprising the step of peak detecting said command signal to provide a peak detected command signal having a voltage of an amplitude equal to said periodic signal, the peak detected command signal then being sent to the excitation control loop of the vector-controlled AC electric machine.

7. The method of claim 5, further comprising the step of peak detecting said filtered signal before said step of amplifying.

8. The method of claim 5 wherein said step of providing a periodic signal provides a sinusoidal signal.

9. A device for providing an optimal excitation value with respect to stator current, magnetic flux and magnetic induction, in the form of a command to an excitation control loop of an electric machine so as to minimize electromagnetic losses in copper and iron components thereof, where the electric machine has a speed of movement between stator and rotor components thereof, the rotor being subjected to a rotor current, said device comprising:

detector means for providing a periodic signal having an angular frequency proportional to the speed of movement between the stator and rotor components of the electric machine;

rotor current signal means for providing a rotor current having an amplitude proportional to the rotor current;

amplitude-modulation means for modulating said periodic signal by said rotor current signal to provide a modulated signal;

low-pass filter means for filtering said modulated signal so as to provide a filtered signal, said low-pass filter means having a dominant pole time constant of T1 and a dominant zero time constant of T2; and amplification means for amplifying said filtered signal by a constant K to provide a command signal;

wherein said command signal is sent to the excitation control loop of the electric machine; and wherein further each of T1, T2 and K have been set so that said command signal has an optimal excitation value which effects to cause minimization of the electromagnetic losses of the electric machine.

10. The device of claim 9, wherein the electric machine is a DC electric machine.

11. The device of claim 10, further comprising peak detector means for receiving said command signal and thereupon providing a peak detected command signal having a DC voltage of an amplitude equal to said periodic signal, the peak detected command signal then being sent to the excitation control loop of the DC electric machine.

12. The device of claim 10, further comprising peak detector means for providing peak detection of said filtered signal.

13. The device of claim 9, wherein the electric machine is a vector-controlled AC electric machine.

14. The device of claim 13, further comprising peak detector means for receiving said command signal and thereupon providing a peak detected command signal having a voltage of an amplitude equal to said periodic signal, the peak detected command signal then being sent to the excitation control loop of the vector-controlled AC electric machine.

15. The device of claim 13, further comprising peak detector means for providing peak detection of said filtered signal.

* * * * *